United States Patent [19]

Lesser et al.

[11] Patent Number: 5,317,124
[45] Date of Patent: May 31, 1994

[54] STUD WELDING

[75] Inventors: Carl W. Lesser, Swartz Creek; Earl J. Schnur, Lake Orion, both of Mich.

[73] Assignee: Emhart Inc., Newark, Del.

[21] Appl. No.: 89,822

[22] Filed: Jul. 12, 1993

[51] Int. Cl.$^5$ ............................................. B23K 9/20
[52] U.S. Cl. ................................. 219/99; 219/98
[58] Field of Search ................................. 219/98, 99

[56] References Cited

U.S. PATENT DOCUMENTS 4,297,560 10/1981 Netzsch .................................. 219/98
4,988,842 1/1991 Van Allen .............................. 219/98

5,030,815 7/1991 Glorioso ................................ 219/98

Primary Examiner—Clifford C. Shaw
Attorney, Agent, or Firm—Edward D. Murphy

[57] ABSTRACT

Method and apparatus for automatically compensating for spring fatigue and aging, mechanical wear, and the like in a stud welding machine. In order to hold plunge time at an ideal constant value, the plunge times of each weld are measured and a running average is generated to adjust the command to drop the stud onto the workpiece as necessary to hold plunge time substantially at the ideal constant value.

2 Claims, 1 Drawing Sheet

STUD WELDING

FIELD AND OBJECT OF THE INVENTION

The present invention relates to stud welding, especially as it is used in the manufacture of automotive vehicles. More in particular, the invention pertains to improvements in the method and apparatus used for such stud welding wherein the wearing, aging and the like of parts of the welding machine is automatically accommodated to maintain high quality welds over a long period of usage.

BACKGROUND OF THE INVENTION

A stud welder comprises a power source and a gun or head which includes a collet to carry a stud to be welded to a workpiece. Welding is performed by first contacting the stud and the workpiece, and passing a relatively low current, called a pilot current, through the stud and workpiece. While this pilot current is flowing, the stud is lifted or moved away from the workpiece by a relatively short predetermined distance by means of a lift solenoid. This creates a pilot arc. Then, a much larger current, called the main arc current, is sent through the arc which was drawn when the stud was raised with respect to the workpiece. The main current is applied for a predetermined time sufficient to cause the stud and the workpiece to melt. Then, after a predetermined time after the main arc is stopped, the stud is urged into the workpiece to thereby weld the stud to the workpiece.

The time between the cessation of the main arc until actual contact of the stud on the workpiece is critical. This time is called "plunge time". If the plunge time is too long, the stud and/or the workpiece will have cooled to the point where no weld will occur. If the plunge time is too short, then the molten metal will splash, and a poor weld or no weld will result.

SUMMARY AND ADVANTAGES OF THE INVENTION

The problem to which the present invention is addressed, is that, with the passage of time and the making of thousands and even hundreds of thousands of welds, springs and the like in and associated with the lift solenoid wear and age. Other associated parts also wear and deteriorate. This causes the so called drop "time" to lengthen. Drop time is the elapsed time between the moment the lift solenoid is commanded to drop or move the stud to the workpiece, and the time when actual contact occurs.

The present invention provides method and apparatus to accommodate changes in drop time while holding the plunge time substantially at the ideal constant value.

The present invention provides method and apparatus to maintain a running average of the actual plunge times of a predetermined number of welds prior to forming each subsequent stud weld. As the average plunge time changes, the drop time is adjusted, by changing the moment of giving the lift solenoid command to drop at an earlier or a later time to accommodate these aging, wear, mechanical and the like changes in the welding machine. In this manner, plunge time is automatically maintained very close to the ideal by the invention method and apparatus.

BRIEF DESCRIPTION OF THE FIGURES OF THE DRAWING

The invention will be best understood when this specification is read in conjunction with the accompanying drawing also forming a part of this disclosure, and in which.

DESCRIPTION OF THE PREFERRED EMBODIMENT

Figure 1:
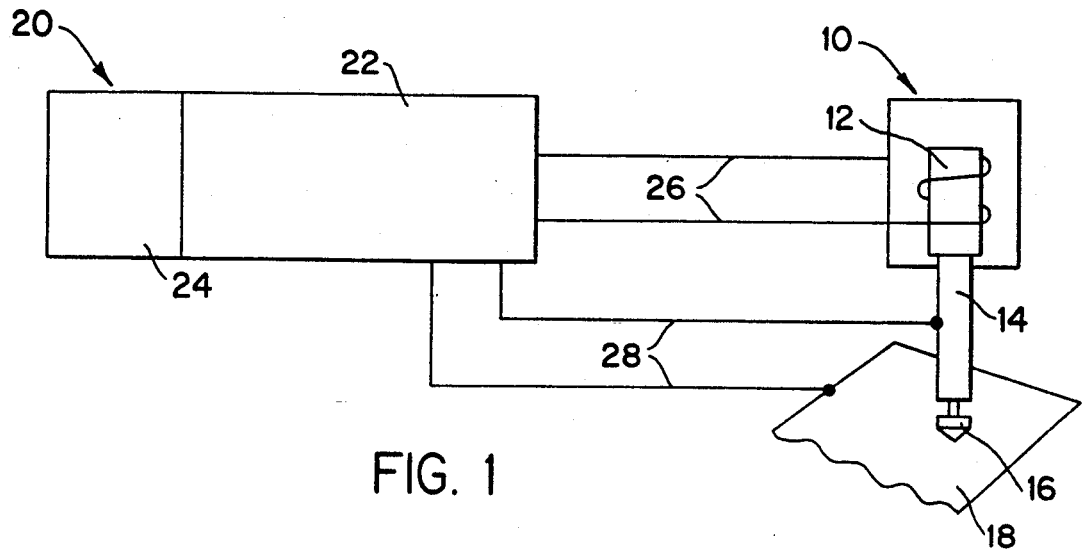
FIG. 1 is a simplified schematic diagram of a stud welding machine including the invention.

Referring now to FIG. 1, the invention is shown applied to a stud welding machine comprising a gun or head 10. A lift solenoid 12 is provided in this head or gun 10, and it carries a collet 14 in which studs 16 which are to be welded to the workpiece 18 are carried. As is known, the studs 16 may be manually fed individually into collet 14, or automatic feeding means can be provided. The balance of the welding machine of which gun or head 10 is a part, is indicated by block 20.

Block 20 includes a controller and power supply portion 22, and computation means 24. Computation means 24 can be integral to the welder, or it can be a separate computer or microprocessor. A pair of lines 26, called the lift solenoid power lines, interconnect portion 22 and the solenoid 12. In a similar manner, a pair of power lines 28 interconnect portion 22, the collet 14 and the workpiece 18 to create first the pilot arc and later the main arc.

Figure 2:
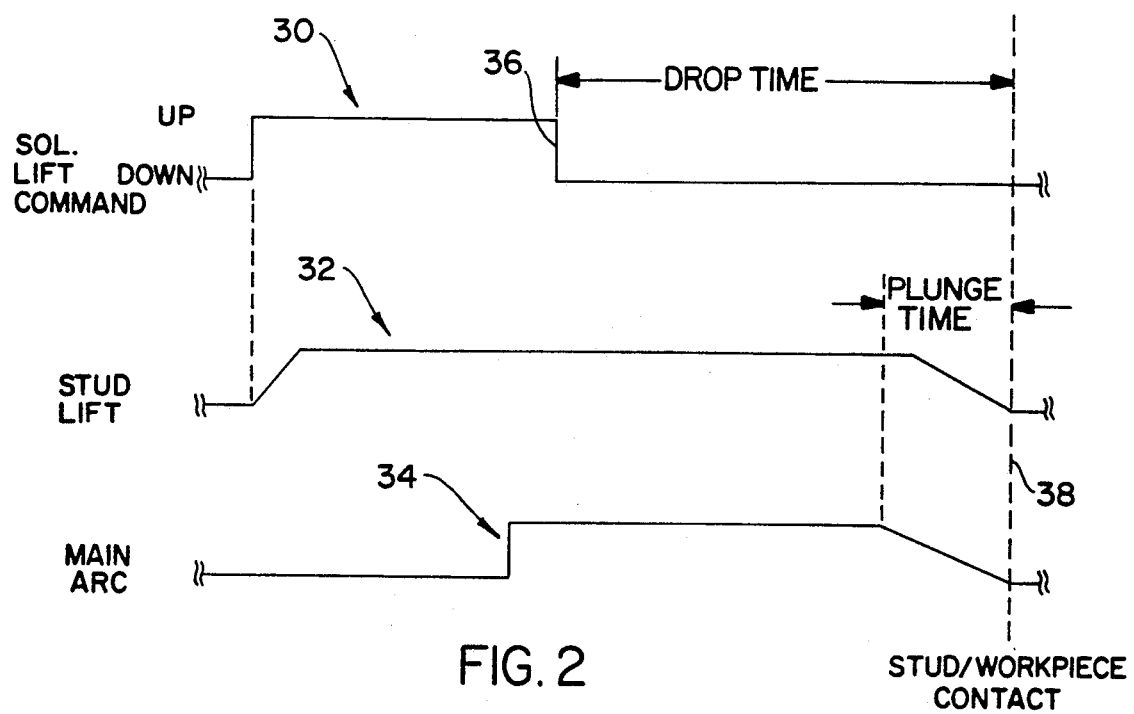
FIG. 2 is a family of curves showing the timing of various parameters which will be useful in explaining the invention.

Referring to FIG. 2, a family of three curves 30, 32 and 34 is shown. Curve 30 indicates signals on lines 26 to command the solenoid 12 to raise and lower the collet 14 carrying the stud 16 with respect to workpiece 18. Curve 32 shows the actual response of the lifting and lowering of the stud in response to the commands on curve 30. Curve 34 shows the main arc carried on lines 28. The pilot arc is not important for purposes of the invention, it can be "on" essentially all the time, or just at the beginning of the process to draw the pilot arc through which the main arc is later passed.

"DROP TIME" is indicated on curve 30. This is the elapsed time from the command to the solenoid 12 to drop the stud onto the workpiece and the time when the stud actually contacts the workpiece. "PLUNGE TIME" is shown with respect to curves 32 and 34, and this time equals the elapsed time from cessation of power to the main arc until actual contact of the stud 16 with the workpiece 18. Contact of the stud and workpiece is indicated by line 38.

Computation means 24 must be suitably programmed to accomplish the method of the invention. In a Successfully constructed embodiment of the invention, the programming was as follows.

In the following mathematical analysis:

W = a working location
$D_D$ = the desired drop time
C = the drop command, measured from start
$\Delta = D_D - W$
D = measured drop time for N samples
  (= in the following lines means replace the value on the left with the value on the right)

$$W = \left(\frac{N-1}{N}\right)W$$

$$W = W + \left(\frac{1}{N}\right)D$$

$$\Delta = D_D - W$$

$$C = C + \Delta$$

This analysis is performed after each weld to generate a new $D_D$ for the next weld, i. e., the method is performed on a running or rolling basis.

For example, if 4 samples were used, the formulas are:

$$W = \tfrac{3}{4}W$$

$$W = W + \tfrac{1}{4}D$$

$$\Delta = D_D - W$$

$C = C + \Delta$ and return to the first step.

When the machine is first set up for welding, the plunge time is determined by a skilled operator by making adjustments in the duration and magnitude of the main arc, and by timing the beginning of the plunge time; that is, the cessation of the main arc with respect to the stud drop command 36 on curve 30. However, the drop time varies with wear of the parts, wearing and fatigue of springs, and other factors. The goal is to cause the stud to contact the workpiece no earlier or later than at a predetermined time after the main arc has been cut off, i.e., at the end of the ideal plunge time. It is desired that the stud and condition to form a proper weld. As drop time changes for the reasons set forth above, the plunge time will change, because the stud/workpiece instant of contact (line 38) will vary with drop time.

In order to automatically compensate for these changes, the plunge times of a predetermined number of previous welds, on a rolling basis, are averaged and compared to the ideal plunge time as determined by the technician at the time of initial setup. This computation is done after each weld. The drop command 36 is moved earlier or later in the cycle as necessary to cause the plunge time of the next cycle to be equal to that ideal plunge time.

Typically, the invention will be used with main arc currents in the range of about 500 to about 2,000 amperes applied for between 5 and 50 milliseconds. Plunge times will be on the order of 2 to 3 milliseconds. The studs will be raised from the workpiece on the order of 0.050 inches. Finally, in producing the correction according to the invention, the computation means 24 will work with a predetermined number of prior welds. It is contemplated that between 4 and 8 actual plunge times of such prior welds will produce good results.

While solenoid 12 is shown as the means to move the stud toward and away from the workpiece; it will be understood by those skilled in the art that other mechanical means, such as a stepper motor, or other pneumatic or other types of such means, could also be used. Thus, the term "lift means" as used herein shall be understood to include all such means.

While the invention has been described in some detail above, it is to be understood that this detailed description is by way of example only, and the protection granted is to be limited only within the spirit of the invention and the scope of the following claims.

We claim:

1. In a stud welding machine having lift means for moving a stud toward and away from a workpiece to which it is to be welded and means to create a main arc between said stud and said workpiece to melt the portions of said stud and said workpiece to be welded together, the improvement comprising a method of compensating for changes in drop time to hold plunge time substantially at an ideal constant value, comprising the steps of measuring the actual plunge time of each weld, continuously averaging a predetermined number of said actual plunge times on a rolling basis, and changing the time of the drop command to said lift means to the next cycle.

2. The method of claim 1, wherein said predetermined number of actual plunge times which are averaged is between 4 and 8.

* * * * *